United States Patent
Hennion et al.

(10) Patent No.: US 9,067,622 B2
(45) Date of Patent: Jun. 30, 2015

(54) VEHICLE ROOF MADE OF GLASS COMPRISING LOCALIZED ZONES OF COMPRESSIVE STRESS

(71) Applicant: SAINT-GOBAIN GLASS FRANCE, Courbevoie (FR)

(72) Inventors: Alexandre Hennion, Venette (FR); Philippe Frebourg, Senlis (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/351,049

(22) PCT Filed: Oct. 12, 2012

(86) PCT No.: PCT/FR2012/052330
§ 371 (c)(1),
(2) Date: Apr. 10, 2014

(87) PCT Pub. No.: WO2013/054060
PCT Pub. Date: Apr. 18, 2013

(65) Prior Publication Data
US 2014/0252808 A1 Sep. 11, 2014

(30) Foreign Application Priority Data
Oct. 14, 2011 (FR) .................................. 11 59324

(51) Int. Cl.
*B62D 29/00* (2006.01)
*B62D 25/06* (2006.01)

(52) U.S. Cl.
CPC ......... *B62D 29/00* (2013.01); *Y10T 428/24322* (2015.01); *Y10T 428/24777* (2015.01); *B62D 25/06* (2013.01)

(58) Field of Classification Search
CPC ................... B62D 25/06; B62D 29/00; Y10T 428/24777; Y10T 428/24322
USPC .......................... 296/210, 219, 216.01, 216.09
See application file for complete search history.

(56) References Cited

U.S. PATENT DOCUMENTS 3,724,704 A * 4/1973 Edwards et al. ............... 220/226
4,201,828 A * 5/1980 Triebel et al. ................. 428/332

(Continued)

FOREIGN PATENT DOCUMENTS

| EP | 1 375 307 | 1/2004 |
| FR | 2 981 295 | 4/2013 |

OTHER PUBLICATIONS

International Search Report and Written Opinion as issued for International Application No. PCT/FR2012/052330, dated Dec. 17, 2012.

(Continued)

*Primary Examiner* — Pinel Romain
(74) *Attorney, Agent, or Firm* — Pillsbury Winthrop Shaw Pittman LLP

(57) ABSTRACT

An automotive vehicle roof that has two longitudinal edges and two transverse edges and that is symmetrical with respect to a median longitudinal plane, the roof consisting of a glazing unit including at least one mineral glass sheet, the sheet including a border of compressive edge stresses and at least two localized zones of compressive stress inside the border, the zones being placed symmetrically relative to the plane of symmetry and each localized zone of compressive stress being less than 30 cm from a longitudinal edge.

16 Claims, 2 Drawing Sheets

(56) References Cited

U.S. PATENT DOCUMENTS

| | | | |
|---|---|---|---|
| 4,919,473 A * | 4/1990 | Laimighofer et al. ... | 296/187.12 |
| 5,094,034 A * | 3/1992 | Freeman .................. | 49/501 |
| 6,467,225 B1 * | 10/2002 | Shimomura ............... | 52/204.5 |
| 6,913,310 B2 * | 7/2005 | Albert ..................... | 296/210 |
| 7,972,676 B2 * | 7/2011 | Kleba et al. .............. | 428/116 |
| 8,167,364 B2 * | 5/2012 | Burns ...................... | 296/210 |
| 8,449,019 B2 * | 5/2013 | Kodama et al. ........... | 296/187.02 |
| 2004/0075302 A1 * | 4/2004 | Chon et al. ............... | 296/210 |
| 2008/0106124 A1 | 5/2008 | Snider | |
| 2009/0148642 A1 | 6/2009 | Mauser et al. | |
| 2011/0210579 A1 * | 9/2011 | Marur et al. ............. | 296/187.03 |
| 2011/0314871 A1 * | 12/2011 | Olivier et al. ............ | 65/104 |
| 2013/0285417 A1 * | 10/2013 | Yoshida ................... | 296/210 |

OTHER PUBLICATIONS

Search Report as issued for French Patent Application No. 1159324, dated May 14, 2012.

* cited by examiner

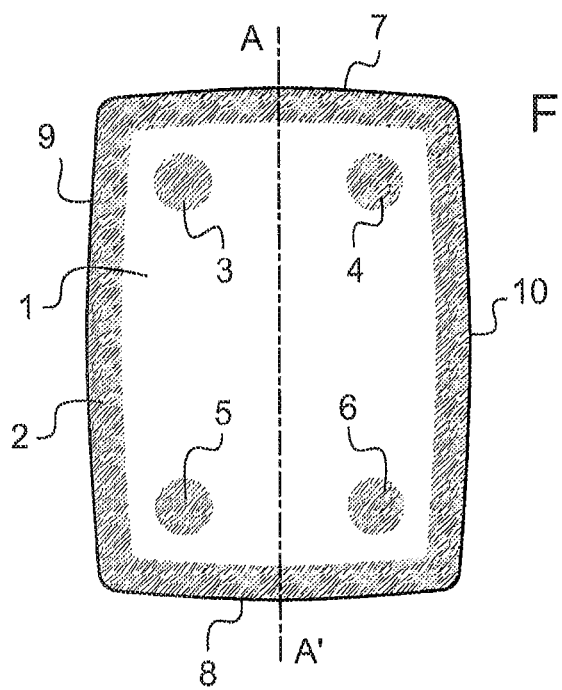
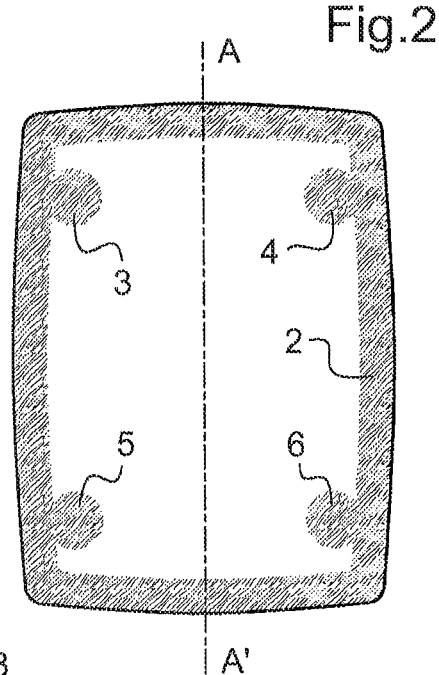
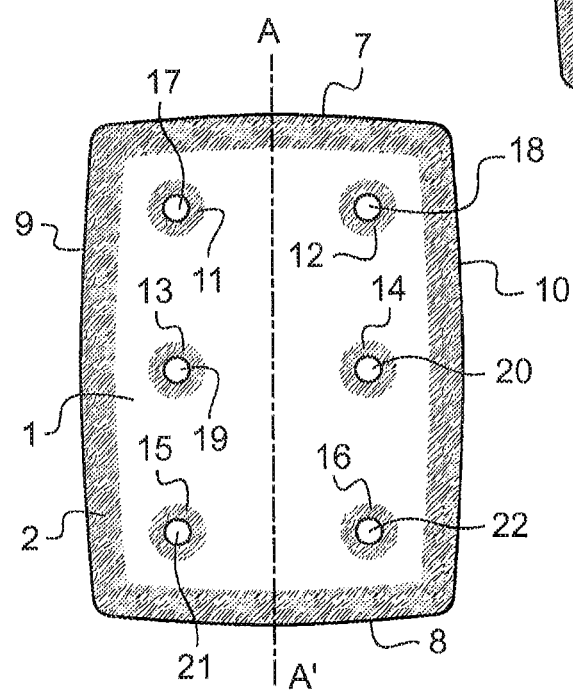

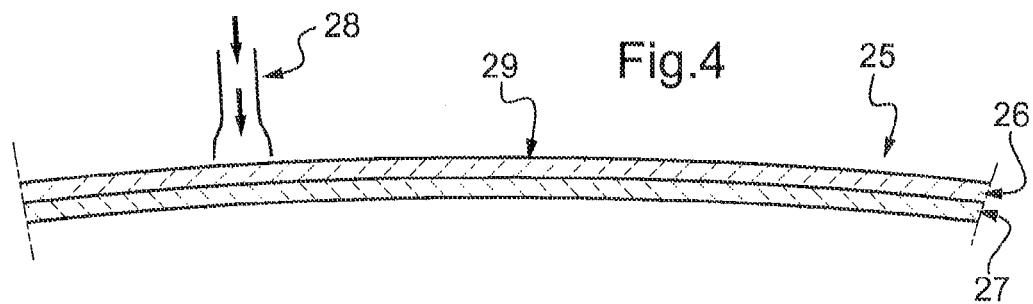
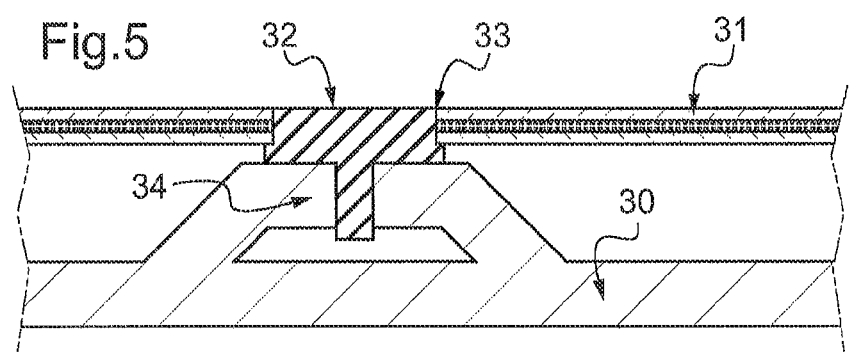
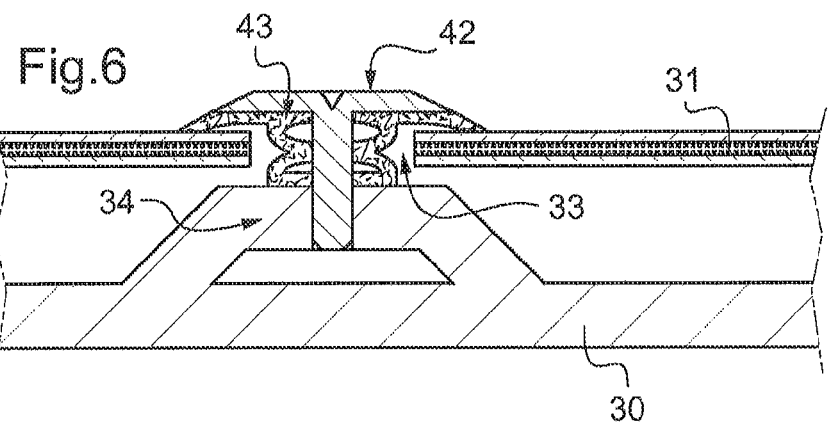
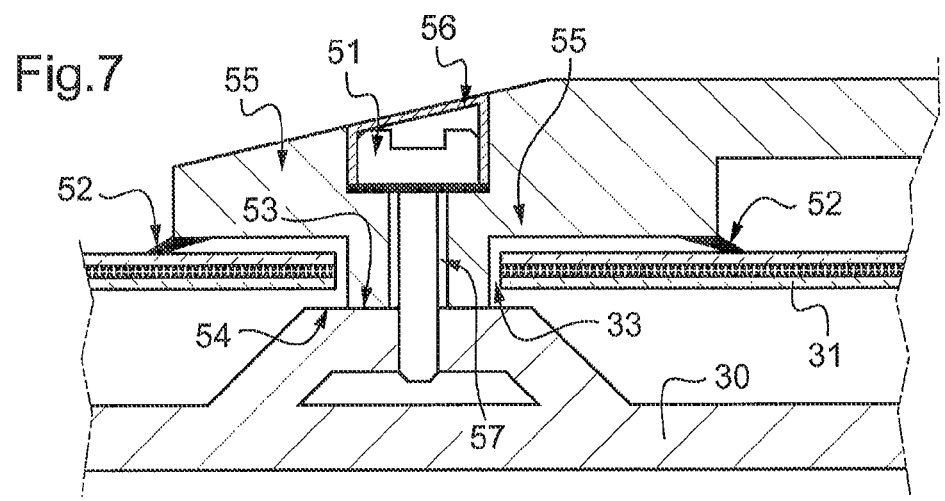

VEHICLE ROOF MADE OF GLASS COMPRISING LOCALIZED ZONES OF COMPRESSIVE STRESS

CROSS-REFERENCE TO RELATED APPLICATIONS

This application is the U.S. National Stage of PCT/FR2012/052330, filed Oct. 12, 2012, which in turn claims priority to French Application No. 1159324, filed Oct. 14, 2011. The content of both applications are incorporated herein by reference in their entirety.

The invention relates to a product made of glass for a vehicle, especially an automotive vehicle, especially to a roof provided or capable of being provided with orifices for the passage of shafts for fastening roof rails. The glass may be tempered or laminated.

Glass roofs are particularly advantageous in automotive applications since, by virtue of the transparency of the material, these roofs, especially when they are wide, increase the sensation of space inside the vehicle, which effect is highly desired by manufacturers and end users. Compared to a part made of monolithic tempered glass (comprising a single sheet of tempered glass) a laminated roof increases the passive safety of the vehicle because it can withstand flipping of the latter (referred to as rollover). Moreover, in the case where it breaks unexpectedly, a laminated roof prevents even small pieces of glass from falling onto the passengers. It is therefore advisable to use laminated parts for roofs if they are of substantial size. Compared to a roof made of plastic, a roof made of laminated mineral glass is advantageous because it resists aging and scratching, and because of its cost.

Currently it is difficult to accommodate roof rails, which are in general fitted to vehicles as standard or as an option, on glass roofs, especially wide glass roofs. The presence of these roof rails is however important for a number of reasons: a) they contribute to the general line of certain types of vehicle such as estates or SUVs (sports utility vehicles); and b) they are necessary if additional baggage-carrying space is to be installed on the roof of the vehicle i.e. a bike rack, etc.

Automobile manufacturers would like to make the transparent part of the glazing unit as large as possible. The solution customarily adopted for attaching roof rails are notches, i.e. a "reentrant" indent along the edge of the glass. Whether the roof rails are chosen as an option or not, the vehicle is fitted with the same notched glazing unit. When roof rails are not present, the space left free is filled with a generally quite unesthetic trim.

Designers who appreciate the esthetical quality of glass have stated the need for glass areas that reach the lateral parts of the roof and that even extend as far as the upper edges of the doors.

In addition, notches are difficult to produce using conventional automotive conversion processes. Producing such notches requires numerous adjustments, scrap, and many quality-related returns. Notches are a common source of flakes or breakages during the cleaving and "burning" operations of manufacture. In addition, during the gravity bending of the glass sheets, especially of superposed sheets, the presence of notches makes it difficult to keep the glass on the tooling throughout the forming phase, which sometimes results in the glass detaching from its tooling, thus making it unsuitable for sale. Development of the tooling and the heating program is difficult and takes a long time, and scrap from production is substantially greater than for notch-free volumes. In addition, the appearance in reflection of notched volumes is never excellent, the glass always containing, in these regions, slight marks and counter-bends. With other bending techniques, it is possible to form each glass sheet separately, by pressing or forming the sheets on the run between roller beds, and then to assemble them in a subsequent step. In contrast to the gravity-bending process, this technique ensures the glass is secure on its tooling during the bending. Nevertheless, this process, called sheet-by-sheet processing, is extremely sensitive to any lack of parallelism between the two glass sheets, which may result in breakages or in the appearance of bubbling at the periphery of the glazing unit once assembled. Notched glazing units are indeed particularly prone to this problem.

All these difficulties become considerably more problematic when it is sought to produce parts with deeper notches in the surface of the glass. Finally, apart from the aforementioned difficulties, the minimum radius of the indent of the notch is limited by the standard diameters of edge-shaping molds. Producing notches with small radii either requires a suitable additional machine, or the use of small-diameter molds that are not able to provide effective shaping, i.e. shaping that is rapid and of a high quality, of the remaining part of the periphery of the part. It is clear that current techniques are incompatible with the development of roofs with more "encompassing" shapes, i.e. roofs that cover the lateral parts of the vehicle. This is because the roof rails would then be fastened inside the general area of the part. The presence of very deep notches, which is prohibitive for the reasons regarding the conversion process described above, would require a screen located between the upper edge of the door and the points where the roof rails are fastened. Such a screen would be unesthetic, all the more so because it would be very obvious to someone located beside the vehicle.

As has been seen above, bending a notched glazing unit is very difficult and requires development of a specific process. It is economically impossible to provide manufacturers with notch-free glazing units for vehicles of the same type, but sold without roof rails. Specifically, such an option would require the manufacture of a new set of tools and different manufacturing runs.

The invention overcomes the aforementioned drawbacks. Specifically, according to the invention, notches are no longer produced in the edges of the glazing units, thereby obviating manufacturing problems related to their production during cutting and bending steps. Instead of notches, orifices are produced, the outlines of which are contained entirely within the main faces of the glass roof. The optical quality in reflection of the roof is improved thereby. It is thus possible to envision more innovative roof designs, with shapes that extend sideways and that possibly cover the lateral parts of the frame. It is even possible to envision glass roofs that reach as far as the doors. The expression "main face" is understood to mean the large surfaces of objects such as panels, sheets, panes: all these objects comprising two main faces and one edge face.

The invention relates to an automotive vehicle roof consisting of a glazing unit possibly made of laminated or tempered glazing, and comprising localized zones of compressive stress, each zone surrounding an orifice or intended to surround a subsequently drilled orifice. If there are no orifices in the glazing unit, then the glazing unit is laminated rather than tempered (i.e. it does not comprise a tempered sheet) and orifices may be produced, after lamination, in the localized zones of compressive stress.

If it is laminated, the glazing unit comprises at least two sheets of untempered mineral glass separated by a sheet made of a polymer, generally polyvinyl butyral (PVB). It may comprise more than two glass sheets (especially 3 sheets), it being understood that a polymer sheet separates the various glass sheets.

If it is tempered, the glazing unit comprises a single sheet of tempered mineral glass.

If the area of one of its main faces is larger than 0.9 m², it is preferable for the glazing unit to be laminated.

The area of a main face of the glazing unit is equal to the area of one main face of the mineral glass sheet.

The product according to the invention is a vehicle roof made of laminated or tempered glass, drilled, or able to be drilled, in a number of places, and where each aperture allows the passage of a shaft for fastening roof rails to the structure of the vehicle. The edge of the holes in the glass may be fitted with a trim of modest dimensions, securely fastened to the roof rail.

The invention relates to an automotive vehicle roof that has two longitudinal edges and two transverse edges and that is symmetrical with respect to a median longitudinal plane, said roof comprising at least one mineral glass sheet, said sheet comprising a border of compressive edge stresses and at least two localized zones of compressive stress inside said border, said zones being placed symmetrically relative to said plane of symmetry and each localized zone of compressive stress being less than 30 cm from a longitudinal edge. Generally, the localized zones of compressive stress are less than 20 cm from a longitudinal edge.

The roof has four external edges, two longitudinal edges corresponding to the direction of movement of the vehicle, and two transverse edges lying perpendicular to the direction of movement of the vehicle. The median longitudinal plane is vertical when the roof is fitted to the vehicle and is perpendicular to the roof and to the center of the transverse edges. This longitudinal median plane is a plane of symmetry of the roof both in terms of its appearance but also at the level of the structure and stresses in the glass.

The glass sheet comprises a border of compressive edge stresses that strengthens it. If the roof contains a number of glass sheets (case of a laminated glazing unit), each of the sheets comprises a border of compressive edge stresses. Those skilled in the art know how to produce this type of border around the entire perimeter of the glazing unit, whether the glass is tempered or not.

According to the invention, the glass in the border of edge stresses and in the localized zones of stress inside said border comprises permanent compressive stresses of sufficiently large magnitude to allow the glass part to withstand the various mechanical stresses to which it is subjected during it use, especially during its handling, its transport, its fitting to the frame of the vehicle, deformation of the chassis of the body of the vehicle, external mechanical stresses (example: bag placed directly on the roof, various shocks, etc.) or thermal stresses (heating of the vehicle when the weather is cold or automobile parked under strong sunlight, etc.). The level of compressive edge stress that is useful depends on the magnitude of the mechanical or thermomechanical stresses to which theses edges may be subjected in use.

Stresses are generated in glass products when the glass is heated to a temperature above which it loses its purely elastic behavior and becomes slightly plastic or exhibits the behavior of a viscoelastic liquid. On cooling, and depending on the initial thermal inhomogeneity of the sample and/or the heterogeneity of the cooling itself, certain zones set before others. Because of the thermal expansion, permanent compressive and tensile stresses appear in the sample while it is cooling. Qualitatively, the parts where the glass sets first correspond to the parts where the compressive stresses are concentrated, whereas the parts where the glass sets more slowly concentrate the zones of tensile stresses. The edge stresses described in the present application are membrane stresses that may be defined, at any point M in the material and for a given direction, as the average of the stress field at this point in this direction, the average being taken over the entire thickness of the sample. At the sample edge, only the membrane stress component parallel to the edge is applicable, the perpendicular component having a zero value. Thus any measurement method allowing average stresses along an edge and through the thickness of the sample to be measured may be used. Methods for measuring edge stresses use photoelasticimetry techniques. The two methods described in the ASTM standards cited below allow the edge stresses to be measured:

the method using the Babinet compensator and described in standard ASTM C1279-2009-01, procedure B; and measurements carried out with commercially available instruments such as the Sharples model S-67, sold by Sharples Stress Engineers, Preston, UK, and using what is called a Senarmont or Jessop-Friedel compensator. The measurement principle is described in standard ASTM F218-2005-01.

In the context of the present application, the compressive stress values are determined using the method described in standard ASTM F218-2005-01.

Generally, the edge stresses, in the border of stresses or in the localized zones of stresses, are between 1 and 100 MPa in magnitude.

The glazing unit serving as a roof comprises localized zones of compressive stresses located inside the border of edge stresses. The expression "inside the border" signifies that the localized zones are not on the border, but on the contrary that they are separate from the border lying closer to the center of the glazing unit than the border. These localized zones may in contrast touch or adjoin the border. These localized zones either surround an orifice and act to stress the edge of the orifice, or do not surround an orifice but are intended optionally to surround an orifice and then act to stress the edge of this orifice. Compressive stresses of between 1 and 4 MPa in magnitude will possibly be sufficient for small apertures located far from the external edges of the part. Intermediate levels between 4 and 8 MPa in magnitude or even greater, between 8 and 12 MPa in magnitude, increase the strength of the part, reducing the risk that it will break. Thus, these compressive edge stresses in these localized zones are generally between 1 and 100 MPa in magnitude and are preferably between 4 and 12 MPa in magnitude in the case of a laminated glazing unit, and between 15 and 60 MPa in magnitude in the case of a tempered glazing unit. Generally, these values are measured between 0.1 and 2 mm from the edge and preferably between 0.5 and 1 mm from the edge. In the case where a localized zone of compressive stress does not surround an orifice, insofar as it is a zone making it possible to subsequently create an orifice, then the stress value can be determined after drilling of an orifice, followed by measuring the stress at the distance from the edge of the orifice such as indicated above.

In the same way as for conventional parts made of laminated or tempered glass (windshield, roofs, rear window, side windows), the periphery of the glazing unit is itself reinforced mechanically by the presence of a border of permanent compressive edge stresses. The level of compressive stresses that is useful corresponds to compressive stresses higher than 4 MPa in magnitude, even in certain particular cases higher than 8 MPa in magnitude. Thus these compressive edge stresses at the periphery of the glazing unit are generally between 4 and 100 MPa in magnitude and are preferably between 8 and 30 MPa in magnitude in the case of a laminated glazing unit and between 15 and 60 MPa in magnitude in the case of a tempered glazing unit.

The border of compressive edge stresses generally has a width, on each main face of the glazing unit, of 0.1 to 3 cm measured from the external edge.

The roof rails are equipped with elements for fastening them to the automotive vehicle. These elements serve, on the one hand, to rigidly and securely fasten the rails to the vehicle, and on the other hand, to keep the bars and the roof a certain distance apart (generally from 1 to 20 cm). This distance allows objects to be fastened to the roof rails by passing fastening members between the rails and the roof.

The roof rails may be placed parallel to the direction of movement of the vehicle (longitudinal direction), in which case they are connected to the vehicle in two or three fastening points via fastening elements (shafts) that pass through the roof. The roof rails may be placed perpendicularly to the direction of movement of the vehicle (transverse direction), in which case they are connected to the vehicle by two fastening points via fastening shafts that pass through the roof. In any case, the position of the orifices for the passage of the fastening shafts is symmetric with respect to the vertical plane parallel to the direction of movement of the vehicle and passing through the middle of the roof (and through its center of gravity). The glazing according to the invention serving as a roof is entirely symmetrical with respect to this plane, which passes through the middle of its front transverse edge and the middle of its rear transverse edge (same direction as that of the vehicle for which it is intended).

Fitted to the automotive vehicle, the roof comprising the glazing unit according to the invention may be equipped with roof rails. Alternatively, it is possible not to equip the vehicle with roof rails, in which case the orifices may be fitted with removable covers, which are preferably discrete, until roof rails are optionally installed. The owner of the vehicle thus has the option of fitting roof rails to their vehicle during the lifetime of the latter.

In the case where the glass sheet of the glazing unit is tempered, it is generally the only glass sheet in the glazing unit. This type of glazing unit may be manufactured as follows: a flat untempered glass sheet that has been cut to shape and drilled is first hot bent and then tempered. The edge stresses are thus produced at the border of the sheet and around the orifices. If the glazing unit is tempered, the orifices are always produced before the temper.

In the case where the roof is made of laminated glass, in a first embodiment it comprises orifices for the passage of elements (shafts) for fastening roof rails. To produce this glazing unit, it is possible to start with two flat glass sheets that are cut to shape and drilled. These sheets are then bent, either simultaneously in the bonded state as in conventional gravity bending processes for laminated products, or sheet by sheet (in which case the sheets are bent one after the other). Controlled cooling of the glass allows permanent compressive stresses to be generated on the periphery of the glazing unit and on the periphery of the holes. The product is then assembled and baked in an oven before undergoing a finishing step. Thus a laminated glazing unit equipped with orifices for the passage of roof rails is obtained. If specific levels of stresses must be obtained at the edges of the holes, it is possible to use localized heat treatment processes that use air jets, screens made of insulating materials, cold or hot pads applied to the glass or deposited layers allowing the emissivity of the surface of the glass sheets to be modulated in locations. These local modifications of the cooling are known and regularly used in glass conversion processes.

Again for the case where the roof is a glazing unit made of laminated glass, but in a second embodiment, the glazing unit does not contain orifices for roof bars, but does comprise the compressive stresses allowing orifices to be drilled in the glazing unit after it has been formed and assembled and forming the edge stresses that reinforce said orifices. It is thus possible to supply a roof free from visible holes (and therefore having a perfectly esthetical appearance) but the particular stress state of which allows the production of holes for the passage of elements for fastening roof rails directly to the vehicle. Such drilling of the glazing unit made of laminated glass may be carried out in a standard repair workshop (garage) by means of portable tools suited to machining glass, during the operation for fitting the roof rails to the vehicle. In this embodiment, it is in particular possible to proceed as follows. First the various substrates that are to be joined together in a laminated glazing unit are formed simultaneously. To do this, they are placed side by side (for example they are superposed) and bent together. Sheets are thus obtained that all have the same shape and that thus can be easily assembled. After hot forming, during the cooling phase of the mutually bonded glass substrates, suitable localized cooling is applied causing localized compression through the thickness of the bonded glass substrates in the locations where it is envisioned to drill the apertures for the roof rails. This localized cooling is in addition to the general controlled cooling of the stack of glass substrates. This localized cooling is more rapid than the general cooling. It may be stated that they are differentiated insofar as it is the difference in cooling rate between the general cooling and the localized cooling that is the source of the localized compressive stresses. Preferably, the differentiated localized cooling is such that the edge stresses of the orifice or of the future orifice are of the magnitude given above when it was a question of localized zones of compressive stress (1 to 100 MPa and preferably between 4 and 12 MPa). The process for manufacturing a laminated glazing unit comprising zones of compressive stress in order to allow subsequent drilling post-assembly is described in French patent application No. 1 159 322 of 14 Oct. 2011. The differentiated localized cooling is carried out entirely inside a main face of a glass substrate located in an external position in the stack of glass substrates thereof. This embodiment makes it possible to drill the part after the laminated glazing unit has been assembled, and optionally, as detailed above, to carry out the drilling after the roof has been fitted to the vehicle. In this case, the location where the drilling should be carried out is marked (the mark being discrete, indelible and produced directly on the glazing unit). This location is that where the differentiated localized cooling has been carried out. The locally cooled zone is slightly larger than the zone eventually removed.

These various laminated glass glazing unit versions (with holes, or without holes but in this case with compressive stresses making drilling possible) may be produced with the same tools (especially the bending of the glass substrates), thus removing the need to manufacture two types of tool and reducing the development required for the two types of version. These same tools may also be used to manufacture a range of hole- and compressive stress-free (nondrillable) glazing units. The purchaser of the automotive vehicle may therefore be given the choice between three different options for the same model and at a low cost for the manufacturer.

The glazing unit serving as a roof according to the invention generally comprises at least two orifices or at least two localized zones of compressive stresses inside the main faces, allowing a roof rail to be fastened. The optional existence of zones of compressive stress inside the main faces for the drilling of holes in the finished glazing unit only concerns laminated glazing units. These orifices or localized zones of compressive stress are placed symmetrically with respect to the plane of symmetry of the glazing unit passing through the middle of the front strip and the middle of the back strip of the glazing unit (median longitudinal plane). The glazing unit according to the invention may comprise two, four or six orifices or, in the case of a laminated glazing unit, two, four or six zones of compressive stress, allowing two roof rails to be fastened. Each orifice generally has an area of between 0.5 and 70 cm$^2$ in a main face of the glazing unit. These holes may be circular or polygonal, especially having four sides. In the case of the presence of localized zones of compressive stress, each of these zones is larger than the intended orifice, so that the zone of compressive stress adequately surrounds the orifice after it has been drilled. Each orifice is generally at a distance of at least 0.5 cm from the external edges of the glazing unit and is inside (i.e. it is surrounded by) a zone of compressive stresses. The zone of compressive stress generally extends beyond the edge of the orifice by at least 1 mm and by as much as 1 cm, even by as much as 10 cm. The zone of compressive stress surrounding an orifice or intended for the subsequent drilling of an orifice may reach the border of compressive stress present on the external edge of the glazing unit. There may therefore be a localized zone of compression common to the edge of the hole and the edge of the glazing unit.

BRIEF DESCRIPTION OF THE DRAWINGS

FIG. 1 shows an automotive vehicle roof comprising a laminated glazing unit, seen perpendicularly to one of the main faces in accordance with an embodiment of the invention;

FIG. 2 shows the same elements as FIG. 1 except that the localized zones of compressive stress adjoin the border of compressive edge stresses in accordance with an embodiment of the invention;

FIG. 3 shows an automotive vehicle roof comprising a laminated or tempered glazing unit, seen perpendicularly to one of the main faces in accordance with an embodiment of the invention;

FIG. 4 shows a stack of two glass sheets during their cooling just after bending in accordance with an embodiment of the invention;

FIG. 5 shows an arrangement for the system for fastening the roof rails to the structure of the vehicle and the laminated glass glazing unit, in accordance with an embodiment of the invention;

FIG. 6 shows another way of masking the hole in the glazing unit using a screw serving as a masking cap and a compensating seal in accordance with an embodiment of the invention; and FIG. 7 shows a cross section through the system of FIGS. 5 and 6 but with a roof rail fastened through orifices in the roof made of laminated glass in accordance with an embodiment of the invention.

FIG. 1 shows an automotive vehicle roof comprising a laminated glazing unit, seen perpendicularly to one of the main faces 1. This laminated glazing unit has two transverse edges 7 and 8 and two longitudinal edges 9 and 10. It comprises a border 2 of compressive edge stresses encircling the entire perimeter of the glazing unit. The median longitudinal plane AA' (perpendicular to the figure) is a plane of symmetry of the glazing unit and is perpendicular to the traverse edges 7 and 8 which lie opposite each other. Four localized zones 3, 4, 5, 6 of compressive stresses are located inside the border of compressive edge stresses. Here these localized zones do not adjoin the border. These zones of compression are shown by hachures but in fact they cannot be seen with the naked eye. The localized zones 3 and 4 are placed symmetrically, one facing the other, with respect to the plane of symmetry AA'. The localized zones 5 and 6 are placed symmetrically, one facing the other, with respect to the plane of symmetry AA'. These localized zones make it possible to drill orifices through the laminated glazing unit for the passage of elements for fastening roof rails. Two roof rails may be fastened, either parallel to the plane of symmetry AA' between points 3 and 5 for one and between points 4 and 6 for the other, or perpendicularly to the plane of symmetry AA', between points 3 and 4 for one and between points 5 and 6 for the other.

FIG. 2 shows the same elements as FIG. 1 except that the localized zones 3, 4, 5, 6 of compressive stress adjoin the border 2 of compressive edge stresses.

FIG. 3 shows an automotive vehicle roof comprising a laminated or tempered glazing unit (a single glass sheet in the latter case), seen perpendicularly to one of the main faces 1. This laminated glazing unit has two transverse edges 7 and 8 and two longitudinal edges 9 and 10. It comprises a border 2 of compressive edge stresses encircling the entire perimeter of the glazing unit. The median longitudinal plane AA' (perpendicular to the figure) is a plane of symmetry of the glazing unit and is perpendicular to the traverse edges 7 and 8 which lie opposite each other. Six localized zones 11, 12, 13, 14, 15, 16 of compressive stresses are located inside the border of compressive stresses of the external edges. Here these localized zones do not adjoin the border. The localized zones 11 and 12 are placed symmetrically, one facing the other, with respect to the plane of symmetry AA'. The localized zones 13 and 14 are placed symmetrically, one facing the other, with respect to the plane of symmetry AA'. The localized zones 15 and 16 are placed symmetrically, one facing the other, with respect to the plane of symmetry AA'. These localized zones each surround a through-orifice 17, 18, 19, 20, 21, 22 in the glazing unit for the passage of elements for fastening roof rails. Two roof rails may be fastened in the longitudinal direction, one being held by fastening elements at points 17, 19, 21, the other being held by fastening elements at points 18, 20, 22.

FIG. 4 shows a stack 25 of two glass sheets 26 and 27 during their cooling just after bending. These two glass sheets will subsequently be assembled into a laminated glazing unit. The nozzle 28 blows onto a zone of a main face 29 of the glass substrate 26 (this arrangement is an example since the blowing could be applied to only one or to both main faces simultaneously) in the stack so as to create a zone of compressive stresses allowing the assembled laminated glazing unit to be drilled through, even after it has been fitted to a vehicle.

FIG. 5 shows a possible arrangement for the system for fastening the roof rails to the structure 30 of the vehicle and the laminated glass glazing unit 31, according to the invention. In this figure, the roof rails are not fitted, a cap 32 being used to mask the orifices 33 provided in the glazing unit 31 in order to enable this optional fastening. The hole in the glass glazing unit is located facing a tapped boss 34. The plastic cap 32 makes it possible to:

mask the hole in the glazing unit; and
provide the main seal of the system, preventing large amounts of water from penetrating between the glass and the structure when the vehicle is parked or driven in wet weather.

A system (not shown in this figure) may allow any residual water that infiltrates to be drained toward the front or rear of the vehicle. The cap may be made of a flexible plastic material, thereby advantageously allowing it to deform laterally when the hole 33 in the glass roof and the hole tapped in the boss 34 are not perfectly aligned.

FIG. 6 shows another possible way of masking the hole in the glazing unit using a screw 42 serving as a masking cap and a compensating seal 43. The structure 30 of the vehicle and the laminated glass glazing unit 31 according to the invention are differentiated. In this figure, the roof rails are not fitted, the cap 42 masking the orifices 33 provided in the glazing unit 31 for the purpose of this optional fastening. The hole in the glass glazing unit is located facing the tapped boss 34.

FIG. 7 shows a cross section through the system of FIGS. 5 and 6 but with a roof rail 55 fastened through orifices 33 in the roof made of laminated glass 31 according to the invention. The latter is held using a screw 51 fastened to the body. A flexible peripheral lipped seal 52 makes it possible to:
- compensate for any dispersion that exists in the distance between the top of the boss and the upper surface of the glass;
- provide a primary seal of the system; and
- create continuity between the roof rail and the glazing unit 31 and therefore give the assembly an esthetical finish.

A bearing surface 53 of the roof rail, which bears against a bearing surface 54 of the structure of the vehicle, has been provided in order to allow satisfactory transmission of any possible stress that may be exerted on the roof rails during their use (manual action, exposure to wind, acceleration, fitting of fastening straps, etc.). The width of these bearing points is smaller than the size of the aperture in the roof in order to make up for imperfect concentricity between the latter and the anchoring points. The hole 57 allowing the passage of the screw into the roof rail has sufficient diameter to make up for dispersion in the position of the fastening points relative to the holes in the roof rail. A cap 56 allows the screw head to be masked from the exterior in an esthetical manner.

The invention claimed is:

1. An automotive vehicle roof that has two longitudinal edges and two transverse edges and that is symmetrical with respect to a median longitudinal plane, said roof consisting of a glazing unit comprising at least one mineral glass sheet, said sheet comprising a border of compressive edge stresses and at least two localized zones of compressive stress inside said border, said zones being placed symmetrically relative to said plane of symmetry and each localized zone of compressive stress being less than 30 cm from a longitudinal edge.

2. The roof as claimed in claim 1, wherein at least two localized zones of compressive stress adjoin the border of compressive edge stresses.

3. The roof as claimed in claim 1, wherein the compressive stresses in the border are between 1 and 100 MPa in magnitude.

4. The roof as claimed in claim 1, wherein the two localized zones of compressive stress each surround an orifice.

5. The roof as claimed in claim 4, wherein the compressive stresses at the edge of the orifice are between 1 and 100 MPa in magnitude.

6. The roof as claimed in claim 5, wherein the orifices are located at least 0.5 cm from external edges of the glazing unit.

7. The roof as claimed in claim 5, wherein each orifice is between 0.5 and 70 $cm^2$ in area.

8. The roof as claimed in claim 1, wherein the mineral glass sheet is tempered.

9. The roof as claimed in claim 1, wherein the glazing unit is laminated and comprises at least two glass sheets.

10. The roof as claimed in claim 1, wherein the glazing unit is laminated, there being no orifices surrounded by the two localized zones of compressive stress.

11. An automotive vehicle equipped with a roof as claimed in claim 10.

12. An automotive vehicle equipped with a roof that includes two longitudinal edges and two transverse edges and that is symmetrical with respect to a median longitudinal plane, said roof consisting of a glazing unit comprising at least one mineral glass sheet, said sheet comprising a border of compressive edge stresses and at least two localized zones of compressive stress inside said border, said zones being placed symmetrically relative to said plane of symmetry and each localized zone of compressive stress being less than 30 cm from a longitudinal edge, wherein the two localized zones of compressive stress each surround an orifice, said roof being equipped with roof rails equipped with fastening elements that pass through said orifices.

13. The automotive vehicle as claimed in claim 12, wherein the compressive stresses in the border are between 1 and 100 MPa in magnitude.

14. The automotive vehicle as claimed in claim 12, wherein the orifices are located at least 0.5 cm from external edges of the glazing unit.

15. The automotive vehicle as claimed in claim 12, wherein each orifice is between 0.5 and 70 $cm^2$ in area.

16. The automotive vehicle as as claimed in claim 12, wherein the mineral glass sheet is tempered.

* * * * *